March 1, 1960 W. H. NEFF 2,926,820
DISPENSING AND DISTRIBUTING APPARATUS
Filed Feb. 25, 1957
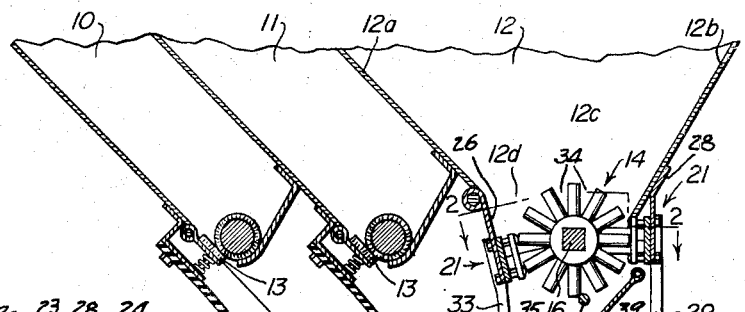
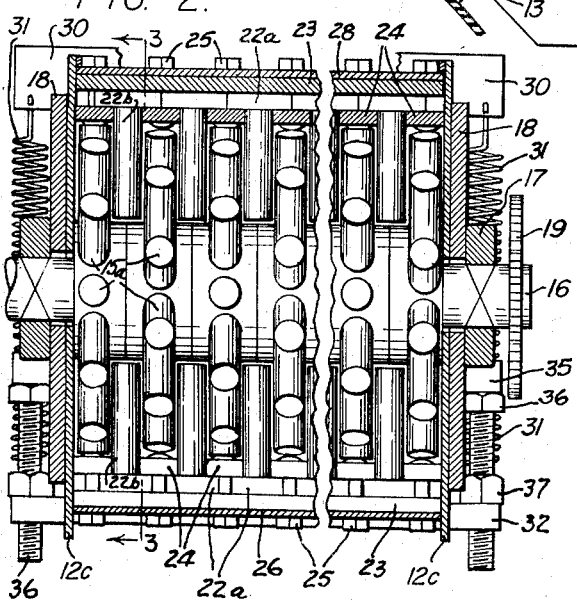
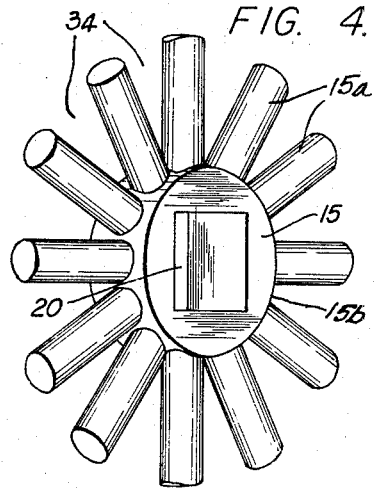
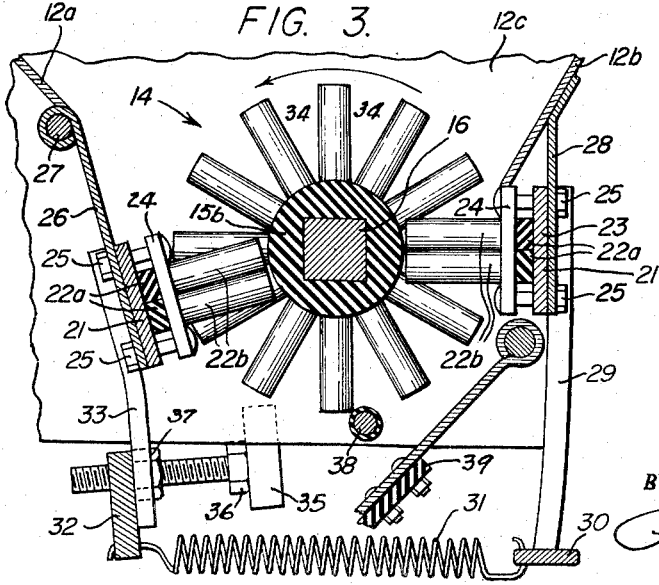
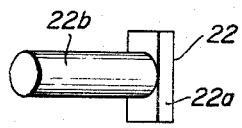
INVENTOR.
WILLIAM H. NEFF
ATTORNEYS

# United States Patent Office 2,926,820
Patented Mar. 1, 1960

2,926,820

DISPENSING AND DISTRIBUTING APPARATUS

William H. Neff, Salt Lake City, Utah

Application February 25, 1957, Serial No. 642,043

12 Claims. (Cl. 222—197)

This invention relates to apparatus for dispensing and distributing a variety of different materials of solid and semi-solid character inherently capable of being dispersed.

The apparatus of the invention was developed especially for incorporation in a lawn planting machine of the general type shown in my U.S. Patent No. 2,733,838, granted February 7, 1956, and entitled "Dispensing Apparatus." However, it may be used wherever found advantageous in the dispensing and distributing of dispersible solid and semisolid materials.

Considerable difficulties are experienced in the distribution of certain normally discrete solid materials when in damp condition, for example, agricultural compost, mulch, manure, and even chemical fertilizers under humid conditions. There is a tendency for the discrete particles or pieces of matter to adhere to one another and to surfaces of any dispensing and distributing mechanism which they contact. Uniformity of dissemination of such damp materials has been very difficult.

Also, conventional methods and apparatus for dispensing and distributing a variety of other materials, such as sand, gravel, cement, soap, and similar items in powdered, granular, flake, and like discrete and inherently dispersible forms are open to considerable improvement from the standpoints of uniformity of distribution and prevention of waste.

It is the primary objective of the present invention to provide relatively simple and inexpensive apparatus for dispensing such materials under close quantity control and for effecting an unusually uniform dissemination thereof, whether in dry, damp, or even wet condition.

A feature of the apparatus of the invention is the combination of a rotor, having a circumferential series of radially extending fingers of flexible resilient material, usually natural or synthetic rubber, with one or more co-operating structures provided with mutually spaced fingers of similar character, between the fingers of which the fingers of such rotor pass in close relationship, to effect a dispensing action on material fed thereto.

Further objects and features of the invention will become apparent from the following detailed description of the particular preferred embodiment illustrated by way of example in the accompanying drawing.

In the drawing:

Fig. 1 represents a fragmentary vertical section taken longitudinally through a lawn planting machine incorporating the apparatus of the invention in the form of a fingered rotor and a pair of co-operating, fingered stators intermeshed therewith;

Fig. 2, a horizontal section taken on the line 2—2 of Fig. 1 and drawn to a considerably enlarged scale, an intermediate portion being broken out for convenience of illustration;

Fig. 3, a vertical section taken on the line 3—3 of Fig. 2;

Fig. 4, a perspective view of one of the circular, fingered units making up the rotor of the foregoing figures, the view being drawn to a scale somewhat enlarged over that of Fig. 2; and Fig. 5, a perspective view of one of the finger units making up the co-operating fingered stator structure of Figs. 1–3, the view being drawn to the same scale as Fig. 4.

Referring to the drawing:

As illustrated, the dispensing and distributing apparatus of the invention is incorporated in a lawn planting machine corresponding in general with that illustrated and described in my aforementioned Patent No. 2,733,838.

Such machine is here illustrated only fragmentarily, for the purpose of showing a typical use of the apparatus of the present invention. It is provided with three hoppers 10, 11, and 12 for containing lawn seed, chemical fertilizer, and compost, respectively, the hopper 10 being for this purpose at the front of the machine. The machine is arranged for transportation over an area to be planted with turf grasses, all as explained in my aforesaid patent. Duplicate mechanisms for dispensing the grass seed and the chemical fertilizer, respectively, are designated 13. They have nothing to do with the apparatus of the present invention.

The present apparatus comprises the hopper 12, as made up of front wall 12a, rear wall 12b, and mutually opposite side walls 12c, and includes the dispensing mechanism shown as closing the elongate bottom discharge opening 12d of such hopper.

In the form illustrated, the dispensing mechanism comprises an elongate, fingered rotor 14 extending longitudinally of and within the discharge opening 12d of the hopper 12, see particularly Fig. 1. Such rotor 14 is made up of a series of circular, flexibly and resiliently fingered units 15, Fig. 4, mounted in side-by-side, contiguous relationship on a shaft 16, whose intermediate portion is square in cross section for the purpose of securely anchoring the several units 15 thereon against rotation relative to the shaft. Such shaft 16 extends lengthwise of discharge opening 12d, and is journaled at its opposite ends in bearings 17 secured, respectively, to reinforcement plates 18, which are, in turn, secured to the mutually opposite side walls 12c of hopper 12. The shaft, and thus the rotor units 15 mounted thereon, are rotated by any suitable drive arrangement, for example, that illustrated in my aforesaid patent, which includes a driven sprocket 19 fixed on a projecting end of the shaft 16.

The individual rotor units 15 are preferably positioned relative to each other as shown in Fig. 2, with the fingers of alternate units offset relative to those of next adjacent units. To this end, the rotor units 15 are provided in two sets, the units of one set having their central, shaft-receiving recesses 20 suitably oriented about their centers relative to the orientation of such recesses of the units of the other set.

As so constituted, the rotor presents circumferential series of radially extending fingers 15a which define radially divergent, dispensing pockets 34 therebetween, see Fig. 4.

Co-operating with the rotor 14 in the controlled dispensing of material from hopper 12 is structure also disposed within and extending along the discharge opening 12d of the hopper. Such structure serves also, with the rotor, as a closure for the hopper discharge opening. It comprises closure members mutually spaced along such opening and projecting thereinto at intervals which define passage for the rotor fingers as the rotor rotates, but which, otherwise, with the rotor, close the opening against uncontrolled passage of material from the hopper. For this purpose, such closure members have respective depths sufficient to completely close successive dispensing pockets laterally when the defining fingers thereof are both abreast of adjoining closure members.

Thus, as illustrated, where the co-operating structure is shown as being flexibly and resiliently fingered to correspond with the fingering of the rotor, and the fingers of the two are intermeshed to close the discharge opening 12d and to effect a controlled discharge therefrom as the rotor rotates, the fingering of such co-operating structure is sufficiently deep to completely close the dispensing pockets 34 laterally.

In the illustrated instance, the co-operating structure comprises a pair of fingered stators, indicated 21, respectively, disposed forwardly and rearwardly of the fingered rotor 14.

Each of the stators 21 is made up of a series of preferably identical upper and lower finger units 22, see especially Fig. 5, each of which has a base 22a and an elongate, preferably cylindrical, flexible and resilient finger 22b projecting therefrom.

The individual finger units 22 are assembled in paired, series, contiguous arrangement on a base bar 23 by means of a series of mutually spaced and transversely extending clamping bars 24 secured to the base bar 23 by means of bolts 25. As so associated, the fingers 22b of the units 22 project outwardly, free and clear of the anchoring base structure.

The forward stator 21 is rigidly secured to an elongate, depending flap plate 26 pivoted to and along the lower margin of the forward wall 12a of the hopper 12, as by means of a pivot pin 27. The securement is preferably by means of the same bolts 25 utilized to retain the assembled stator structure together.

The rearward stator 21 is rigidly fastened along the lower edge of the rear hopper wall 12b by means of a depending bracket plate 28 securely attached to hopper wall 12b, as by welding. Here, also, the assembled stator structure is preferably secured to its bracket plate 28 by means of the same bolts 25 holding the assembled structural components together.

A pair of bracket arms 29 secured to and depending from respective hopper side walls 12c serves to carry, at the lower ends of the component arms, a transverse member 30 to which are anchored corresponding ends of a pair of coil springs 31 which resiliently urge the forward stator 21 backwardly toward the hopper discharge opening 12d and into discharge-closing engagement with rotor 14.

For anchoring the opposite ends of such springs 31 to the forward stator 21, a transverse member 32 is carried by a pair of bracket arms 33 which are rigidly secured to and depend from hinged flap plate 26.

It can be seen that, with this arrangement, the hopper discharge opening 12d is maintained at predetermined size throughout all normal operation of the device, and that such opening is substantially filled and closed by the rotor 14 and stators 21 throughout all normal operation of the device.

Dispensing of material from hopper 12 directly through discharge opening 12d is accomplished by the rotor. The rotating rotor picks up material from the hopper, by reason of gravity flow of such material down into the V-spaces 34 formed between the upstanding fingers 15a of the individual rotor units 15, and carries it at a controlled rate (governed by the speed of rotation of the rotor) down through the stationary fingers 22b of the particular stator unit involved by reason of the direction of rotation of the rotor, here the forward stator unit, to gravity discharge from the now inverted and downwardly open V-spaces 34.

The other stator unit, here the one which is to the rear, serves, along with the up-traveling fingers 15a of the individual rotor units 15, to maintain that portion of the hopper discharge opening closed at all times.

In instances, such as that of the present embodiment, where it is desirable to not let the ends of the fingers 22b of the resiliently urged stator bear against the hubs 15b of the rotor units, limit stop means for the flap plate 26 and the stator carried thereby are provided. As illustrated, such limit stop means comprise a pair of abutment stop members in the form of lugs 35 depending from rigid securement, as by welding, to the hopper side walls 12c, respectively, and a pair of strike members in the form of set screws 36 screwed through opposite end portions of the transverse member 32 and locked in position by respective nuts 37.

For the present embodiment of the invention, the springs 31 and above-described limit stop means constitute means maintaining the discharge-opening-defining means in position corresponding to a predetermined size for the hopper discharge opening, it being realized that the latter is here defined rearwardly by the fixed stator 21, laterally by the fixed hopper side walls 12c, and forwardly by the hinge-mounted stator 21. In instances where both stators 21 are fixedly mounted, such maintaining means would naturally be whatever fastenings were employed to hold the discharge-opening-defining members in fixed position so that the rotor and therewith co-operating structures serve to normally fill and close the discharge opening.

It should be noted that the resiliently urged, hinge mounting for the forward stator 21 is provided as a safeguard to the working mechanism should rocks or other foreign objects of considerable size be forced between rotor and stator.

The individual rotor units 15 and the individual stator finger units 22 are preferably wholly molded from rubber or synthetic rubber, so the fingers 15a and 22b are flexible, resilient, tough, and durable.

It is desirable that a bar 38 be provided longitudinally of the hopper discharge opening, below the rotor but within the path of travel of the finger tips, so as to flick each finger free of any adherent material. The rubber-like character of the fingers are particularly advantageous in this connection.

As in my patented apparatus aforementioned, it is often desirable that a flexible flap or deflection plate 39 be provided below the hopper discharge to define a chute which directs and protects the dispensed material as it falls to the ground.

Whereas this invention is here illustrated and described with respect to a specific embodiment thereof, it should be realized that changes may be made within the scope of the following claims, without departing from the essential contributions to the art made by the teachings hereof.

I claim:

1. Dispensing and distributing apparatus for solid and semi-solid materials inherently capable of being dispersed, comprising a hopper having means defining a bottom discharge opening of predetermined size; a rotor mounted within said opening with its rotative axis extending therealong, said rotor having at least one circumferential series of radially extending fingers of flexible resilient material which define radially divergent, dispensing pockets therebetween; co-operating structure disposed within and extending along said opening, said structure having closure members mutually spaced along said opening and projecting thereinto at intervals which define passage for the rotor fingers as the rotor rotates but which otherwise, together with the rotor, substantially close said opening against uncontrolled passage of material from the hopper, said closure members having respective depths sufficient to completely close successive dispensing pockets laterally when the defining fingers thereof are both abreast of adjoining closure members; means for rotating the rotor; and means normally maintaining said discharge-opening-defining means in position corresponding to the predetermined size of said discharge opening, the successive dispensing pockets of the rotor serving to carry material from the hopper down through said discharge opening as the rotor rotates.

2. The apparatus of claim 1, wherein the co-operating structure comprises two stators, one disposed forwardly of the rotor and one backwardly thereof.

3. The apparatus of claim 2, wherein the rotor and the stators are of correspondingly elongate formation, each made up of a plurality of fingered units.

4. The apparatus of claim 3, wherein the rotor comprises an elongate shaft, the rotor units each comprise a centrally apertured hub from which the fingers radiate, and the rotor units are disposed on said shaft in side-by-side series relationship, said shaft passing through the apertures of the hubs of said rotor units.

5. The apparatus of claim 4, wherein each of the stators comprises means securing the fingered units to the discharge-opening-defining means longitudinally of and along the discharge opening.

6. The apparatus of claim 5, wherein the discharge-opening-defining means includes a plate hinged to the hopper proper longitudinally of the discharge opening to swing toward and away from said opening, one of the stators is secured to said plate, and the position maintaining means for the discharge-opening-defining means comprises a spring constantly urging the latter toward the discharge opening, and a limit stop establishing a set position therefor.

7. The apparatus of claim 6, wherein the fingered rotor units and the fingered stator units are molded of a rubber-like material.

8. The apparatus of claim 7, wherein the fingers of both the rotor unit and the stator units are of elongate cylindrical configuration.

9. The apparatus of claim 8, wherein all the fingers are of substantially equal diameter.

10. The apparatus of claim 1, wherein the fingers of the rotor and the fingers of the co-operating structure are of elongate cylindrical configuration.

11. The apparatus of claim 10, wherein all the fingers are of substantially equal diameter.

12. The apparatus of claim 1, wherein a relatively rigid member is disposed within and extends along the hopper discharge opening, below the rotor but within its rotative path near the extremities of its fingers, for flicking said fingers as the rotor rotates.

References Cited in the file of this patent

UNITED STATES PATENTS

| | | |
|---|---|---|
| 216,377 | Carter | June 10, 1879 |
| 261,627 | Philpot | July 25, 1882 |
| 292,672 | Mekenney | Jan. 29, 1884 |
| 2,718,986 | Peoples | Sept. 27, 1955 |
| 2,723,053 | Gandrud | Nov. 8, 1955 |